(No Model.)

J. & W. D. EYNON.
WHEEL TIRE.

No. 556,341.    Patented Mar. 17, 1896.

WITNESSES:

INVENTORS.
James Eynon
William D. Eynon
BY
ATTORNEY.

UNITED STATES PATENT OFFICE.

JAMES EYNON AND WILLIAM D. EYNON, OF PHILADELPHIA, PENNSYLVANIA.

WHEEL-TIRE.

SPECIFICATION forming part of Letters Patent No. 556,341, dated March 17, 1896.

Application filed October 22, 1895. Serial No. 566,513. (No model.)

*To all whom it may concern:*

Be it known that we, JAMES EYNON and WILLIAM D. EYNON, citizens of the United States, residing in the city and county of Philadelphia, State of Pennsylvania, have invented a new and useful Improvement in Wheel-Tires, which improvement is fully set forth in the following specification and accompanying drawings.

Our invention consists of a novel construction of tire for use on wheels of wagons, carriages, carts or other vehicles, said tire being rolled to conform to the novel shapes hereinafter referred to for facilitating the movement of said wheels in turning out of or leaving railroad-tracks.

It further consists of novel details of construction, all as will be hereinafter set forth.

Figure 1:
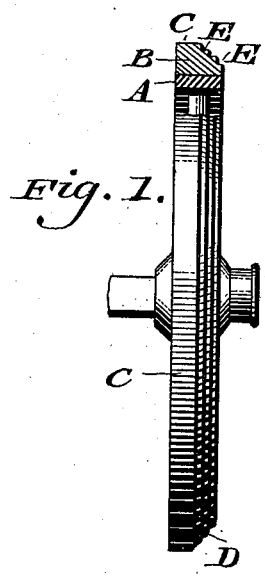
Figure 2:
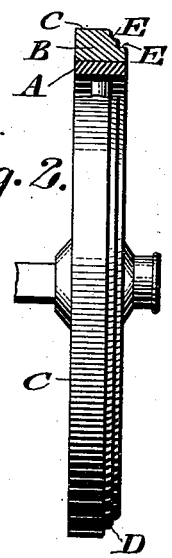
Figure 3:
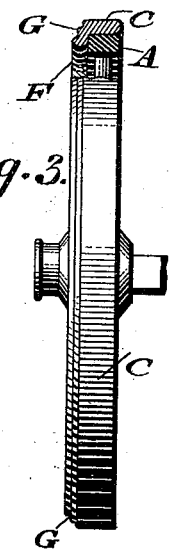
Figure 4:
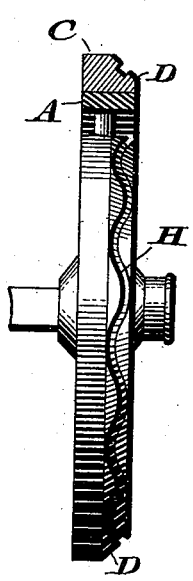
Figure 5:
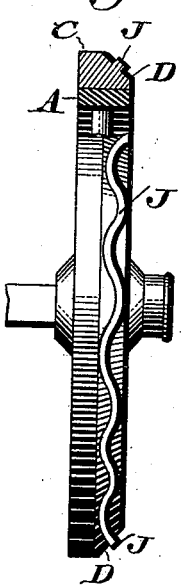
Figure 6:
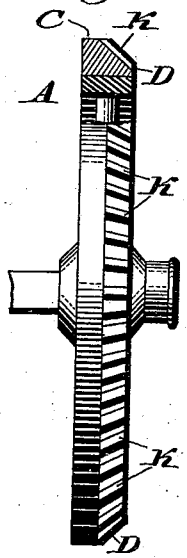
Figure 7:
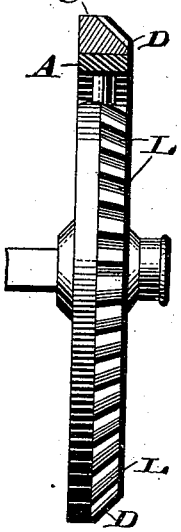

Figures 1 and 2 represent side elevations, partly in section, of a wheel-tire embodying our invention. Fig. 3 represents a similar view of the same, the tire being provided with a flange. Figs. 4 and 5 represent side elevations, partly in section, of a wheel-tire having its beveled face provided with a wavy or serpentine groove or ridge respectively. Figs. 6 and 7 represent side elevations, partly in section, of wheel-tires having their beveled portions provided with ribs and grooves respectively, to be hereinafter referred to.

Similar letters of reference indicate corresponding parts in the several figures.

Referring to the drawings, A designates the felly of a wheel, and B the tire mounted thereon, the same having the tread C, of uniform diameter, and a beveled outer edge or face D, which is provided with the annular grooves or channels E.

In Fig. 3 the tread C is of uniform diameter, as before, while the edge of the tire is projected a short distance beyond the edge of the felly, so as to form a flange F, said flange being provided with a stepped surface formed by the annular ridges or corrugations G.

In Figs. 4 and 5, C designates the tread of uniform diameter, as before, and D designates the beveled portion thereof, the same being provided in the first instance with the serpentine or wavy depression or groove H, while in Fig. 5 the beveled face D is provided with the serpentine ridge or tongue J.

In Figs. 6 and 7, C designates the tread of uniform diameter, as before, while the beveled face D is provided with ridges or ribs K in the case of Fig. 6, and with the similarly-located grooves L in the case of Fig. 7.

It will be apparent from the foregoing that by the employment of our novel construction of tires the wheels to which the same are attached can readily leave car-tracks on turning in either direction, to the right or left, since the beveled faces D, provided with the annular ridges or corrugations, will enable the tires to leave said tracks much easier and readily ride over the shoulders of the rails than if a rectangular shoulder was formed on the outer periphery of the tire, as heretofore.

Having thus described our invention, what we claim as new, and desire to secure by Letters Patent, is—

1. A wheel-tire having a tread of uniform diameter, and an outer beveled or inclined face, said face being provided with annular ridges or projections, whereby a stepped surface is produced, substantially as described.

2. A wheel-tire having a tread of uniform diameter, one side thereof being beveled and having a depending flange adapted to project beyond the edge of the felly of the wheel upon which said tire is mounted, said flange being provided with annular grooves or ridges, thereby forming a stepped surface, substantially as described.

JAMES EYNON.
WILLIAM D. EYNON.

Witnesses:
JOHN A. WIEDERSHEIM,
E. HAYWARD FAIRBANKS.